US012680361B2

(12) United States Patent
Terno et al.

(10) Patent No.: US 12,680,361 B2
(45) Date of Patent: Jul. 14, 2026

(54) DEVICE FOR HOOKING AND ADJUSTING ACCESSORIES ALONG SUPPORT PROFILES

(71) Applicant: TERNO SCORREVOLI S.P.A. UNIPERSONALE, Varedo (IT)

(72) Inventors: Giovanni Terno, Varedo (IT); Emanuele Meni, Varedo (IT)

(73) Assignee: TERNO SCORREVOLI S.P.A. UNIPERSONALE, Varedo (IT)

( * ) Notice: Subject to any disclaimer, the term of this patent is extended or adjusted under 35 U.S.C. 154(b) by 0 days.

(21) Appl. No.: 18/855,692

(22) PCT Filed: Mar. 27, 2023

(86) PCT No.: PCT/EP2023/025136

§ 371 (c)(1),
(2) Date: Oct. 10, 2024

(87) PCT Pub. No.: WO2023/198308

PCT Pub. Date: Oct. 19, 2023

(65) Prior Publication Data

US 2025/0250838 A1 Aug. 7, 2025

(30) Foreign Application Priority Data

Apr. 13, 2022 (IT) ........................ 102022000007370

(51) Int. Cl.
*E05F 5/00* (2017.01)
*E05F 5/06* (2006.01)

(52) U.S. Cl.
CPC ............. *E05F 5/06* (2013.01); *E05Y 2600/56* (2013.01); *E05Y 2900/20* (2013.01)

(58) Field of Classification Search
CPC ... E05F 5/00; E05F 5/003; E05F 5/027; E05F 5/06; E05F 5/08; E05F 5/10; E05D 1/00;
(Continued)

(56) References Cited

U.S. PATENT DOCUMENTS 2,676,680 A * 4/1954 Kindorf .................. E04B 9/183 248/228.2
3,432,197 A * 3/1969 Graves ...................... F16B 1/00 411/85
(Continued)

FOREIGN PATENT DOCUMENTS

DE 29700737 U1 * 4/1997
EP 1609934 A2 12/2005
(Continued)

OTHER PUBLICATIONS

Patent Cooperation Treaty (PCT), International Search Report and Written Opinion for Application PCT/EP2023/025136 filed Mar. 27, 2023, mailed Jun. 1, 2023 International Searching Authority, EP.

*Primary Examiner* — Chuck Y Mah
(74) *Attorney, Agent, or Firm* — McDonald Hopkins LLC

(57) ABSTRACT

A device for hooking and adjusting accessories along support profiles, in particular but not exclusively for apparatuses intended for the movement of cabinet panels or doors comprising at least one sliding profile with a longitudinally extended slot delimited by opposite lips, one or more movement elements or carriages connecting said panels or doors with the profile and one or more stops or shock absorbers or the like with support base to slow down and stop the excursion of the same panels or doors at or near the respective end-strokes. The device comprises a lower half-part and an upper half-part intended to be connected both to each other in an articulated manner and to the profile. The base of the lower half-part defines a plate with a width less than both the width of the slot and with respect to the positioning seat accessed from said slot and in which the same base is positioned. From the central area of the base of the lower half-part an integral appendage extends vertically, at the top of which a transverse hole is formed which accommodates a plug to connect said appendage to the
(Continued)

upper half-part consisting of a manoeuvring lever, in turn provided with a hole for the same plug.

5 Claims, 6 Drawing Sheets

(58) Field of Classification Search
CPC ....... E05D 1/06; E05D 1/0621; E05D 1/0626; E05D 1/0639; E05Y 2900/20; E05Y 2900/212; E05Y 2900/132; E05Y 2600/56; E05Y 2600/10; E05Y 2600/456; E05Y 2600/50; E05Y 2600/52; E05Y 2600/528; F16B 2200/40; F16B 2200/406; F16B 7/187
See application file for complete search history.

(56) References Cited

U.S. PATENT DOCUMENTS 4,143,984 A * 3/1979 Danescu ............... F16B 7/0446 403/194
4,430,019 A * 2/1984 D'Alessio ................. E04G 7/26 182/178.1
5,448,797 A * 9/1995 Coleman ................. E05C 17/28 292/273
6,726,117 B2 * 4/2004 Herb ..................... F16B 37/046 238/315
11,118,388 B2 * 9/2021 Terno ........................ E05F 1/16
2002/0178668 A1 * 12/2002 Haab ....................... E05F 5/003 52/243.1
2006/0113504 A1 * 6/2006 Tollin .................... F16B 19/109 251/257
2006/0222455 A1 * 10/2006 Senakiewich ......... B60P 7/0815 403/252
2007/0138350 A1 * 6/2007 Brown ...................... F16B 2/04 248/65
2014/0259622 A1 * 9/2014 Alkas .................. G09F 15/0068 403/322.4
2017/0217505 A1 * 8/2017 Zehner ................... B62D 25/06
2020/0307754 A1 * 10/2020 McClung ................ B63B 32/66
2023/0071029 A1 * 3/2023 Egger ..................... E06B 7/215

FOREIGN PATENT DOCUMENTS

EP 1785125 A2 * 5/2007 ............. A61G 13/12
EP 3263813 A1 1/2018
FR 3082223 A1 * 12/2019 ............ F16B 37/045
JP 2011074737 A * 4/2011
WO 2019219910 A1 11/2019

* cited by examiner

SECTION E-E
SECTION F-F
E
F
10
12
14
18
20

DEVICE FOR HOOKING AND ADJUSTING ACCESSORIES ALONG SUPPORT PROFILES

CROSS-REFERENCES TO RELATED APPLICATIONS

This application is a national stage application filed under 35 U.S.C. 371 based on International Application No. PCT/EP2023/025136 filed on Mar. 27, 2023, which claims priority to Italian Patent Application No. 102022000007370 filed Apr. 13, 2022, the disclosure of which are incorporated herein by reference in their entireties.

BACKGROUND OF THE INVENTION

Field of the Invention

The present invention relates to a device for hooking and adjusting accessories along support profiles.

More specifically, the present invention relates to a device as defined above, which enables accessories of various kinds to be quickly and smoothly hooked and stabilized in the intended position along metal or nonmetal support profiles.

In a non-limiting embodiment, the device of the present invention has application in the general context of apparatuses intended for the movement of cabinet panels or doors, which typically comprise a suitably shaped sliding profile, typically made of an extruded aluminum or made of other material, one or more handling elements or carriages, which connect said panels or doors with the extruded profile to allow them to slide, and one or more stops or shock absorbers which allow the linear travel of said panels or doors to be slowed down and stopped as they reach at or near their respective end-strokes.

However, the accessories to be hooked and stabilized in place along the shaped profiles can also consist of components of any kind, for example, pulleys or the like not necessarily intended for sliding doors but also for frames of other kinds, such as swinging doors.

In the specific context of slide systems, the stops and shock absorbers used are fixed integrally to the slide rails, consisting of the aforementioned shaped profiles, which include one or more hemispherical heads that are the support and sliding seats for the rollers or wheels of the carriage.

Various types of fastening of the accessories to the sliding rails or shaped profiles are known and for the purpose, in a simpler embodiment, screws can be used which pass through both the accessory to be positioned and the profile; however, this solution requires a specific machining to be carried out on the profile itself, in order to make the necessary holes thereon. In other cases a "push" screw is used, which passes through the accessory to be fixed in which a threaded hole is made; alternatively, an element that is itself threaded is arranged in the accessory. A size groove is then cut in the profile that can fully accommodate the accessory, so that when the screw is tightened its end rests on the bottom of the groove, causing the accessory to move.

Such displacement then pushes said accessory into adherence with the opposite side of the insertion cavity, with the result that it will force against the profile wall realizing the fastening. Other fastening systems involve the use of a screw with a plate provided with a threaded hole; as the screw is tightened, the plate lifts and the profile tabs remain stapled between the plate and the bottom of the accessory, realizing stable positioning. Thereof another known solution involves the possibility of adjusting the overlap of the panels, in which a lever intervenes on the locking of the shock absorber striker element placed on the slide; however, this solution is applicable only to the sliding element and not to the stop.

Recently, as a function of the explicit request of customers, the need has been felt to provide a quick and easy assembly service of fasteners, or any other accessories or functional components, on the respective slide rails; therefore, it has become necessary to ideate a system capable of speeding up the operation of fastening said stops and accessories on the profiles, since traditional apparatuses based on the use of keys or tools inevitably cause slowdowns in installation operations and consequent cost increases. It should also be considered that the use of traditional fastening methods can easily result in actual difficulty in adjusting the assembly on installation, especially when maneuvering tools is required and one is in a position very close to the ceiling of the rooms. Moreover, this situation is usual, as the accessories/components in question are typically placed above the top of furniture and cabinets, thus close to or even adjacent to the ceiling. Another relevant drawback involved in the known methods of fastening and adjusting accessories and components in general along support profiles lies in the need to insert head-on, starting from one end of the profile itself, at least a part of the device connected to such accessories, which entails not insignificant difficulties; in fact, in the presence of an already assembled furniture, it would be necessary to remove the slide profile in order to install, replace or change the position of a fastener or accessory or functional component of any kind, and this would, as can be guessed, entail not a few difficulties. It may also happen that such accessories or components are accidentally installed on the profile upside-down and, even in this case, the intervention required for their correct repositioning is long and difficult. Finally, it should be considered that the operations of fastening, moving or replacing of said stops, accessories and components can be carried out only by skilled personnel, while it would be desirable that, at least the simplest interventions, referring, for example, to the modification of the position along the rail on which they have been installed, could be easily carried out even by the end user himself, who would not thus be forced to resort to the assistance of an expert installer.

Description of Related Art

A sliding door device is known from WO2019219910, in which a plate allows the structure incorporating the sliding element to be connected to the guide rail; this connection requires the use of a screw.

EP 1609934 describes a hinge for metal frames, in which the mouth of the channel of a profile is bounded by opposing fins; these fins define as many undercuts for a plate that allows a hinge element to be locked within the channel of the profile. Such locking is achieved with the use of screws. In European Application No. EP 3263813, which refers to a device for fastening a coupling in the slot of a frame, there is a plate that is led to rotate by driving a screw.

BRIEF SUMMARY OF THE INVENTION

The purpose of the present invention is to overcome the drawbacks complained of above.

More specifically, the purpose of the present invention is to provide a device that enables fastening and adjustment of stops or other functional accessories or components along their respective housing profiles to be carried out quickly and easily, even where there is limited space for maneuvering.

A further purpose of the invention is to provide a device as defined above that does not require the need for the use of handle keys or tools in general to install, remove or move from their respective housing profiles such stops or functional components.

A further purpose of the invention is to provide a device capable of being installed on the respective profile from any point on the profile, thus avoiding the need for the traditional and inconvenient insert head-on from one end of the profile.

Not the least purpose of the invention is to provide a device in which its possible removal from the profile for replacing or simply moving it from its original position does not require the profile itself to be completely removed and then repositioned, which is also extremely useful in the case of unintentional upside-down installation.

A further purpose of the invention is to provide a device capable of being easily installed or moved by the same end user along the respective profile.

A further purpose of the invention is to provide a device for hooking and adjusting accessories along support profiles capable of ensuring a high level of strength and reliability over time, such, moreover, that it can be easily and economically made.

These and other purposes are achieved by the device of the present invention according to the main claim.

BRIEF DESCRIPTION OF THE SEVERAL VIEWS OF THE DRAWINGS

The construction and functional characteristics of the device for hooking and adjusting of the present invention will be more clearly comprehensible from the detailed description below in which reference is made to the appended drawings which show a preferred and non-limiting embodiment and wherein.

DETAILED DESCRIPTION OF THE INVENTION

With initial reference to FIGS. 1 to 4, the device of the present invention can be used for hooking and adjusting along support profiles of elements of any kind; in the specific sector of sliding systems for cabinet panels and door, this device finds advantageous, though not exclusive, application in the fastening to the extruded profiles of upper stops with shock absorber and end-strokes stop, lower stops with or without shock absorber, activators for shock absorbers, and accessories in general that require to be positioned and stabilized along the longitudinal development of the profiles themselves; the application may also extend to doors or window frames made of wood or with frames made of aluminum or other convenient material.

Figures 1, 2, 3, 4:
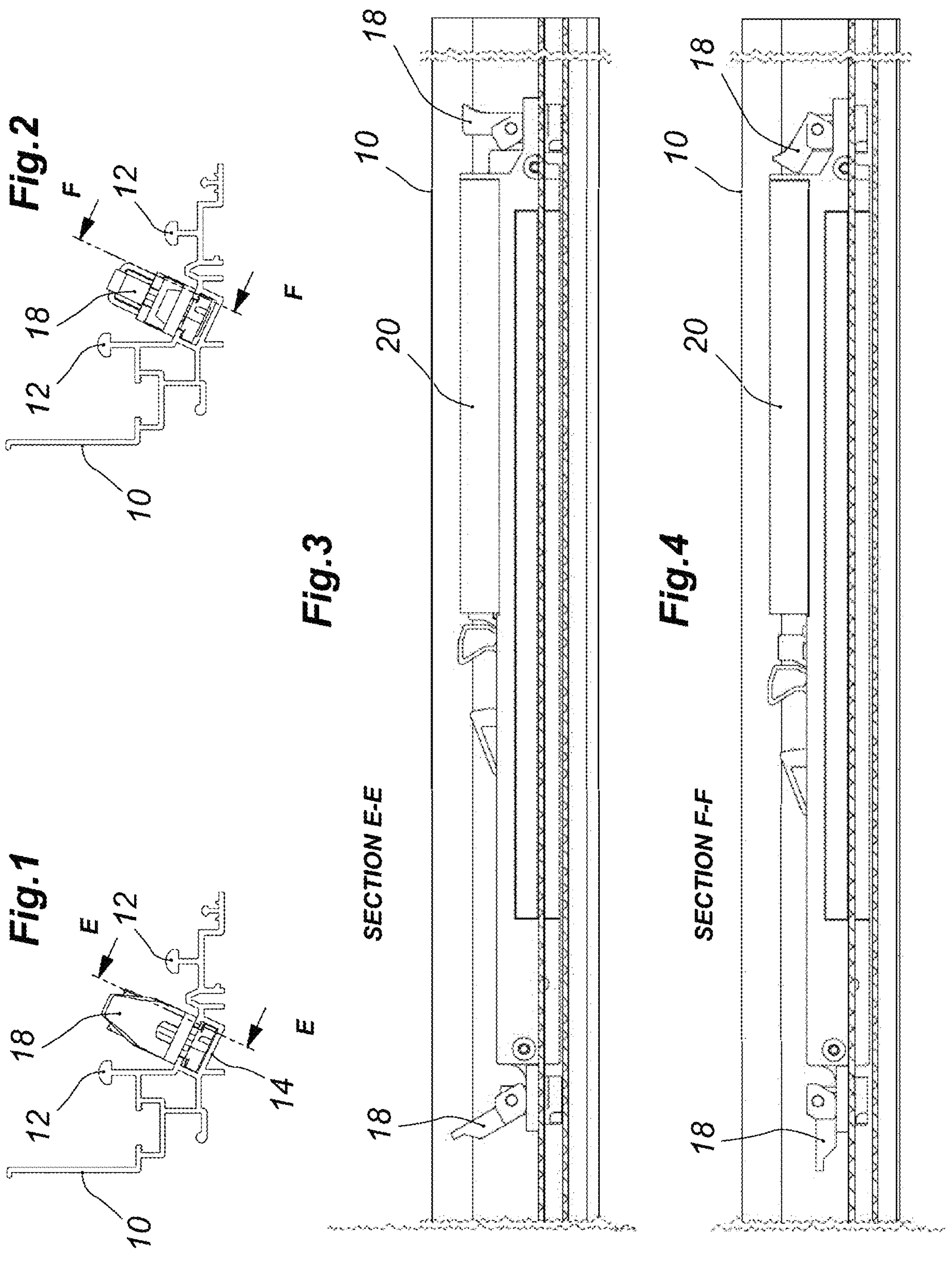
FIG. 1 schematically shows a cross section of the device of the invention arranged on the housing profile in a position prior to its stabilization.
FIG. 2 schematically shows a cross section of the same device arranged on the housing profile in a position following its stabilization.
FIG. 3 schematically shows a longitudinal section of the device along the E-E line of FIG. 1.
FIG. 4 schematically shows a longitudinal section of the device along the F-F line of FIG. 2.
Figure 5:
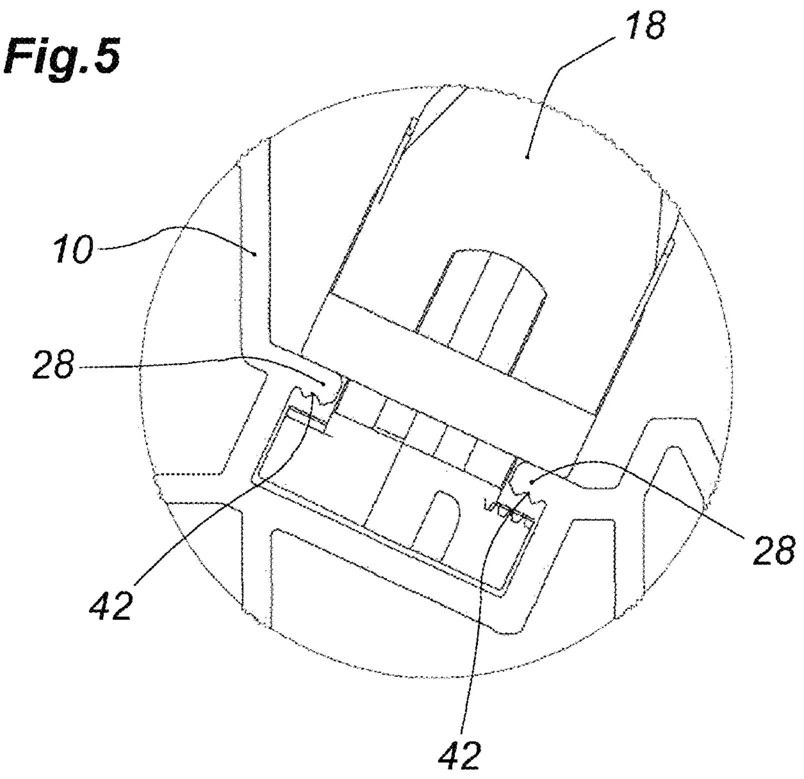
FIG. 5 schematically shows a partial enlargement of FIG. 1.
Figure 11:
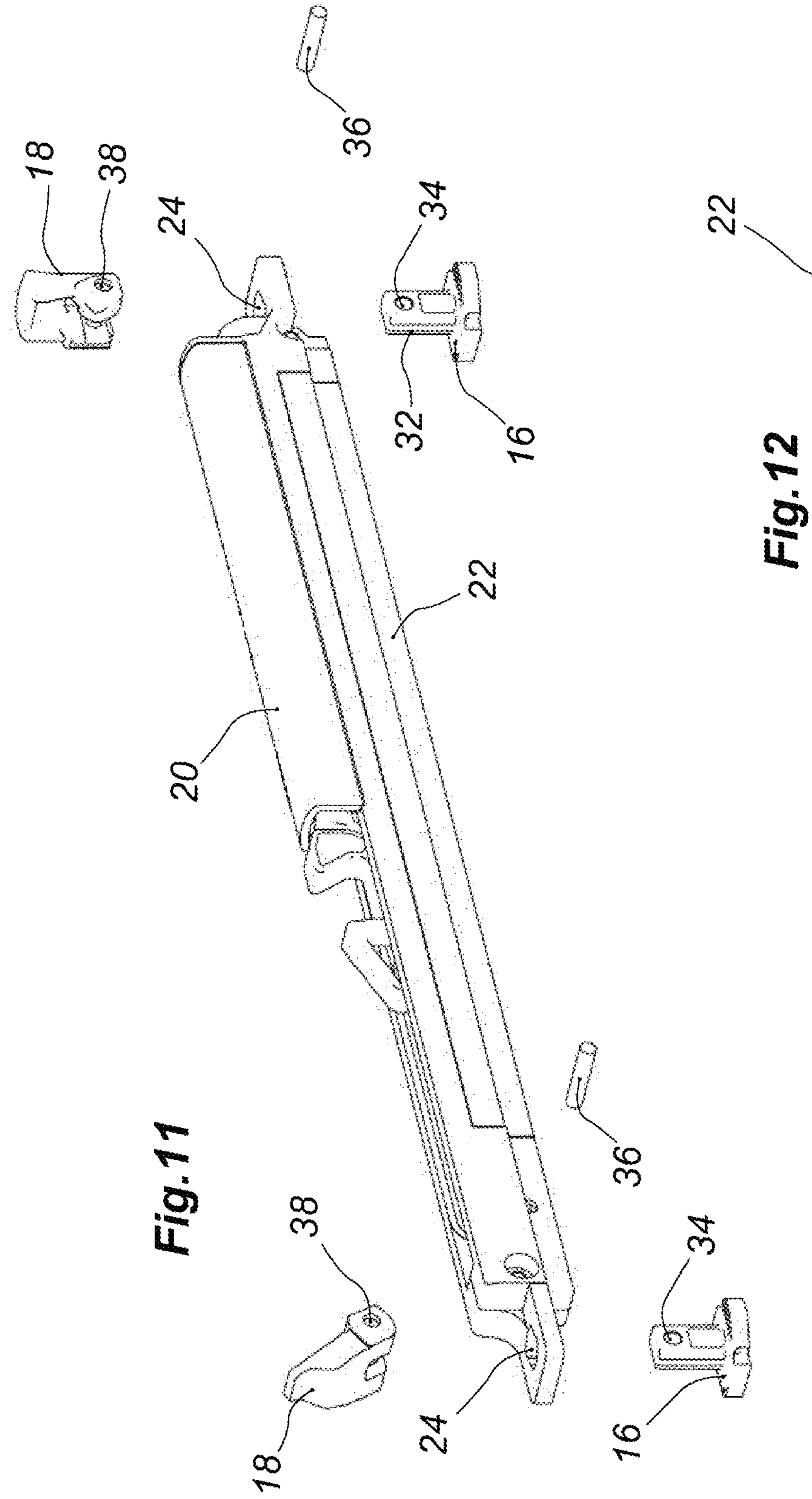
FIG. 11 schematically shows an exploded view of a component such as end-strokes stop, coupled at opposite ends with the device of the invention that enables its fastening to the profile.
Figure 12:
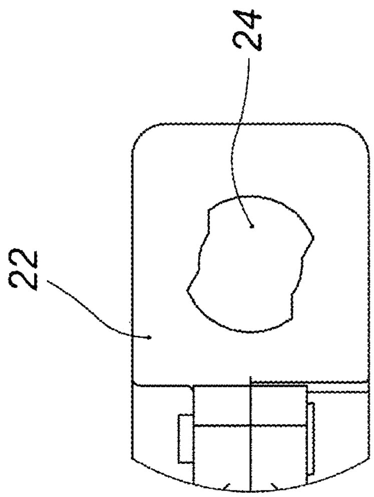
FIG. 12 is a detail of one end of the end-strokes stop in FIG. 11, highlighting the through opening that allows the insertion of a half-part of the device of the invention.
Figure 16:
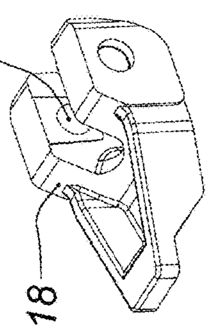
FIGS. 15 and 16 schematically show an axonometric view of two types of the upper semi-part of the device of the invention.
Figure 15:
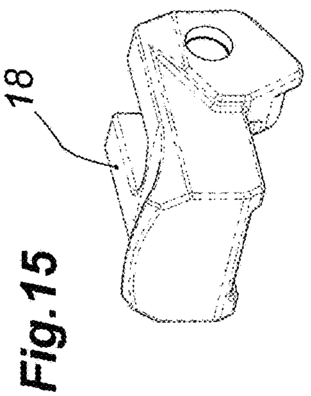

FIGS. 1 and 2 schematize respective cross-sections of a profile 10, itself essentially known, comprising one or more protruding mushroom-shaped appendages 12 constituting the bearing and sliding seat for as many rollers or wheels 12' (FIG. 19) of respective carriages, each of which is connected to a panel or door to allow them to slide along said profile. The profiles 10 are typically provided with an inclined portion 14, which defines the accommodating and stabilizing seat for one or more of the hooking and adjusting devices of the present invention. Each of said devices, as shown in detail in FIGS. 13 to 16, comprises a lower half-part 16 (FIGS. 13, 14) and an upper half-part 18 (FIGS. 15,16), intended to be connected both to each other in an articulated manner and to profiles 10; the latter are preferably made of aluminum, but it is understood that they can be obtained in other materials such as plastic. In FIGS. 3 and 4, profiles 10 support a component of the shock absorber stop type, itself known and indicated by 20, which includes a longitudinally extended support base 22 on which the conventional shock absorber element is arranged; from FIG. 11 the structure of such a stop 20, which at the opposite ends of the support base 22 is provided with an appendage on which the conventional through opening 24 is cut out, is fully noted. However, the shock absorber stop 20 may be substituted by different components or accessories, as further indicated above. In the embodiment shown in the figures, said shock absorber stop 20 is positioned on profile 10 at a longitudinally extended slot 26 with which said profile is traditionally provided, bounded by opposing lips 28 oriented toward the longitudinal axis of said profile 10, as shown in FIGS. 5 and

6; the fastening of the stop 20 is accomplished by means of the device of the invention in the manner hereinafter specified.

Figure 6:
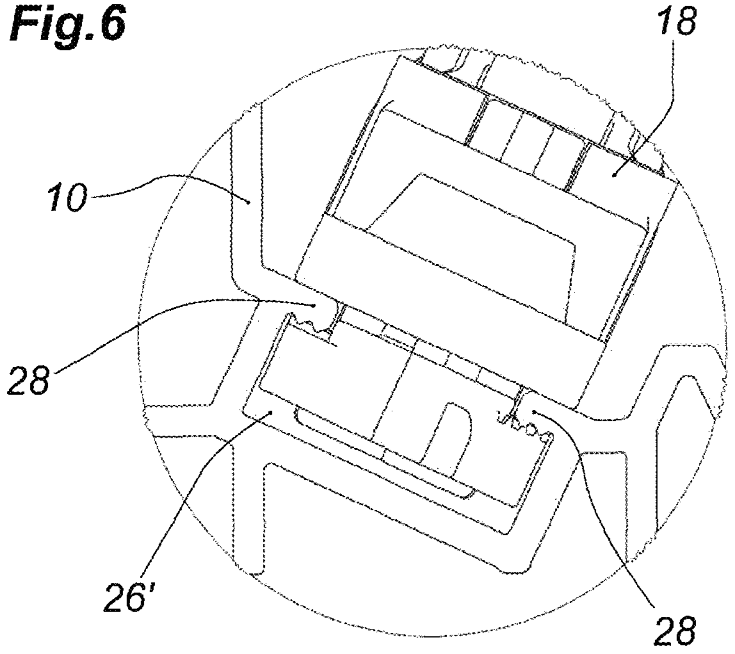
FIG. 6 schematically shows a partial enlargement of FIG. 2.
Figure 8:
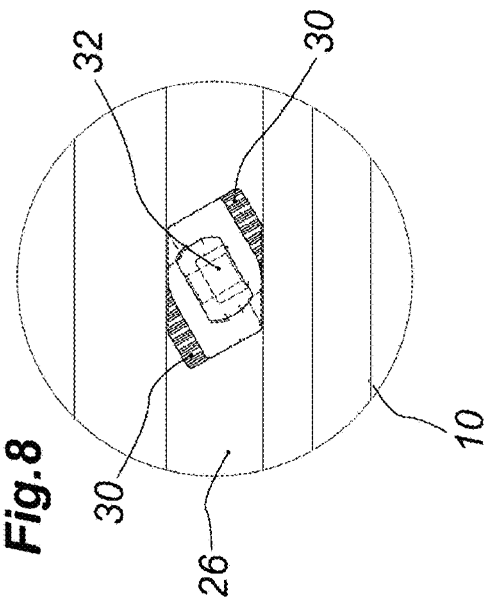
FIG. 8 is an enlarged detail of FIG. 7.
Figure 10:
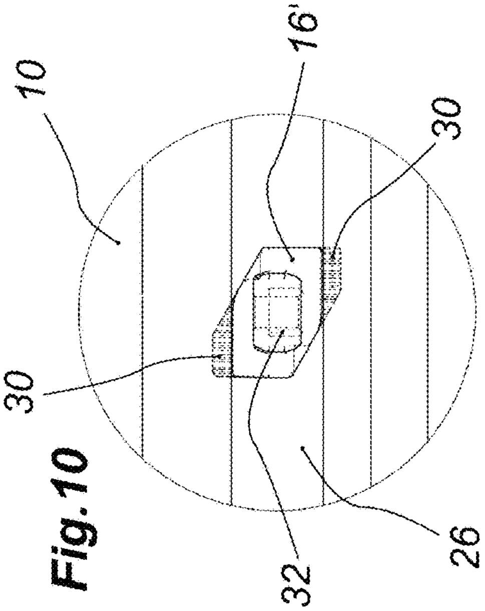
FIG. 10 is an enlarged detail of FIG. 9.
Figure 7:
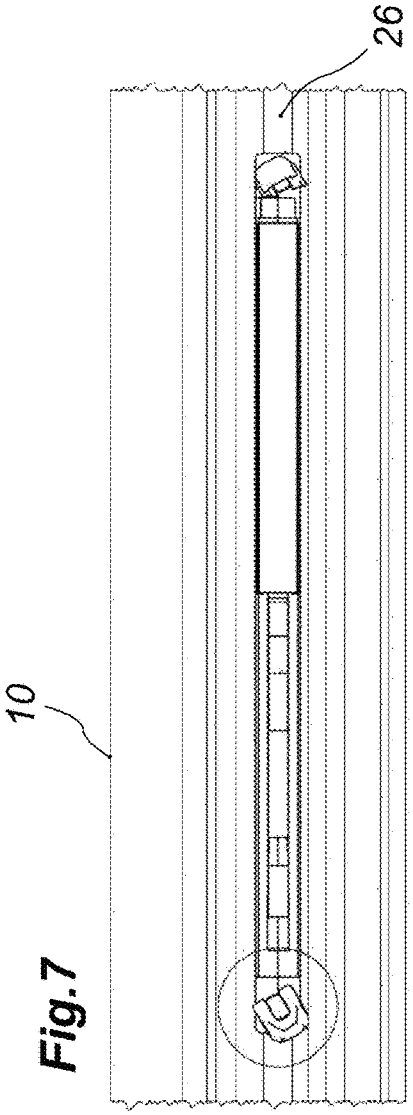
FIG. 7 schematically shows, in top view, a part of the profile on which an example accessory is arranged, in the condition preceding its fastening with the device of the invention.
Figure 9:
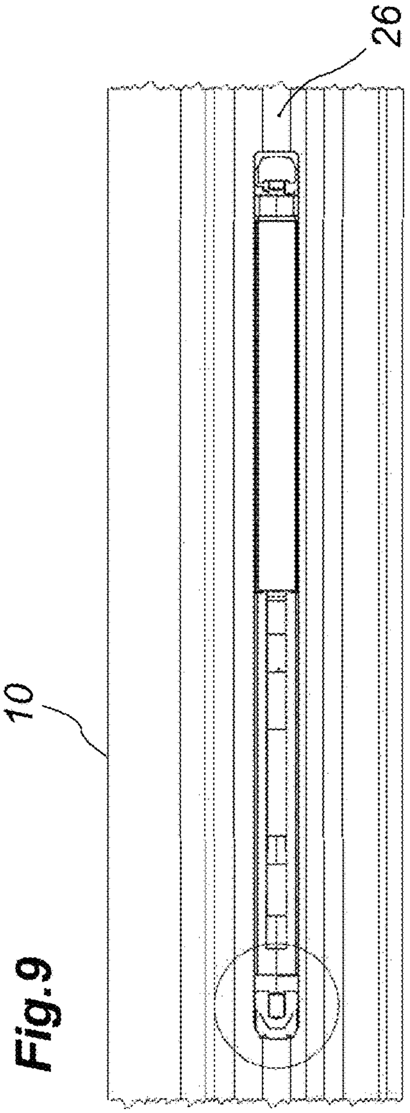
FIG. 9 schematically shows, in top view, a part of the profile on which an example accessory is arranged, in the condition of successful fastening with the device of the invention.
Figure 14:
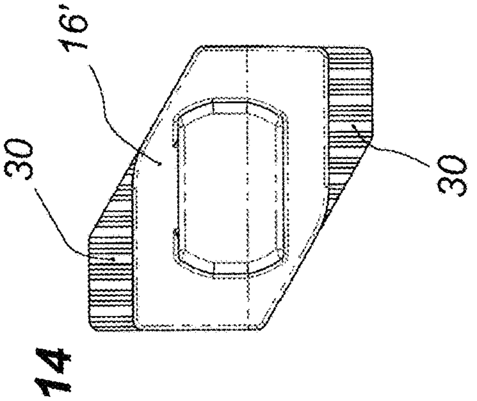
FIG. 14 schematically shows a plan view of the same lower half-part of the device of the invention.
Figure 13:
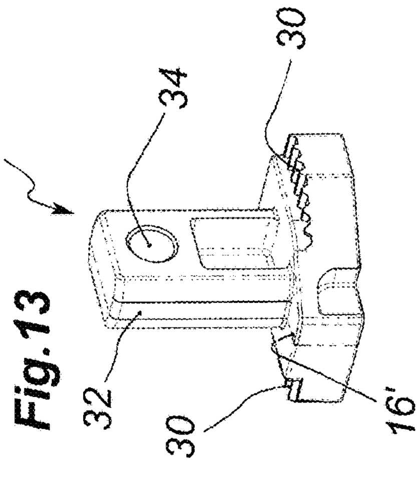
FIG. 13 schematically shows an axonometric view of the lower half-part of the device of the invention.

The lower half-part 16 of said device is inserted into the slot 26 of profile 10 and, before that, into the through opening 24 of base 22 of cushioned stop 20; as noted particularly in FIGS. 8, 10 and 14, the base 16' of the lower half-part 16 defines a substantially rectangular shape plate with two opposite bevelled vertices, from which a "lozenge" configuration is derived overall. This configuration is such that the size of the base or plate 16' is compatible with the width of slot 26 in which it is inserted; in fact, the width of base 16' is less than both the width of slot 26 (FIGS. 7 and 9) and the base placement seat itself, which is accessed from said slot. The positioning seat of the base or plate 16' is indicated by 26' in FIG. 6. After being inserted into the positioning seat 26', the lower half-part 16 as a whole is manually rotated by an amount not exceeding 90°; this rotation causes the base or plate 16' to be oriented, with the opposite parts defining its major dimension, below the lips 28 of profile 10. Such opposite parts of the base or plate 16' are indicated by 30, and a surface finish of the knurling or similar type, as shown in FIGS. 8, 10, 13 and 14, is advantageously made on them; this surface finish may also provide for grooves between them crossed or in any way arranged and developed. The same parts 30 are preferably lowered in relation to the rest of the base 16' by an amount substantially equal to the thickness of the lips 28 (FIG. 13). From the central area of the base 16' is vertically developed an integral appendage 32 with a quadrangular cross-section, at the top of which a transverse hole 34 is formed; to appendage 32 is connected the upper half-part 18 of the device of the invention, consisting of a manoeuvring lever shown in FIGS. 15 and 16. These levers appear different from each other aesthetically, but it is in substance a diversity concerning their size; this is in order to be able to use them alternately according to different application needs. The connection between the upper half-part 18 and the appendage 32 is made by means of a plug 36 (FIG. 11) that passes through hole 34 of appendage 32, a hole 38 formed on the upper half-part 18 and also the support base 22 of the shock absorber stop 20. The connection between the lower half-parts 16 and upper half-parts 18 of the device of the invention is preferably done preliminarily, whereby said device already assembled in its two lower half-part 16 and upper half-part 18 is neared from the top to the profile 10 and threaded into it in the slot 26 of the profile itself starting from the base 16' suitably oriented, as per FIG. 8; at this stage, the half-parts 16 and 18 assembled together by means of the plug 36 are also engaged with the base 22 of the shock absorber stop 20 or any other accessory or functional component. Each upper half-part 18 is conformed so that the hole 38 with which it is provided, into which the plug 36 is inserted, is positioned at an elevation XI with respect to the initial alignment face, while with respect to the final alignment face it is positioned at an elevation X2, which is smaller than XI. When the handling of the half-part 18 is carried out, the base 16' is thus raised by an elevation Y=X1−X2, with the result that it, already properly rotated, brings itself into close contact with the lower face of the lips 28 of the slot 26. The knurling or the like formed on the opposite parts 30 of the base 16' realizes the optimum grip on the said lips, which preferably are themselves provided on the lower face with protrusions 42, visible in FIGS. 5 and 6, extended along the entire length of the lips themselves; these protrusions, e.g., in the form of embossed grooves, are oriented angularly to the surface finish of the opposite parts 30 of the same base 16'.

After securing the upper half-part 18 of the device of the invention to the lower half-part 16 thereof with plugs 36, having thus assembled said device as a whole, the following steps are taken. At this stage, said half-parts 16 and 18 are also engaged with the base 22 of the shock absorbing stop 20 or of any other functional accessory or component; the base or plate 16' is for its part oriented, with the opposite parts 30 defining its major dimension, below the lips 28 of the profile 10, being arranged in the positioning seat 26' of the same base or plate 16'. The shock absorbing stop 20 or any other accessory to be attached to profile 10 is then manually led to translate along the slot 26 of profile 10 itself until it reaches the desired position; at this point, the upper half-part 18 of the device of the invention, which acts as a lever, is operated to possibly orient the base or plate 16' more precisely in the positioning seat 26' and to accomplish the fastening to profile 10 of the device of the invention and the stop 20 attached to it, or any other accessory or component. Such fastening is achieved by the simple lowering of the upper half-part 18 of the device of the invention, which acts as the operating lever; this handling step is schematized in FIGS. 3 and 4. It should be pointed out that, as a result of such lowering, the knurling or the like created on the opposite parts 30 of the base or plate 16', led to rise, etches at least in part the protrusions 42 formed on the lower face of the lips 28 of the profile 10; this makes it possible to achieve a more effective stabilization, safe from possible sliding, of the same plate 16' on the profile 10 from the lips 28.

Figure 18:
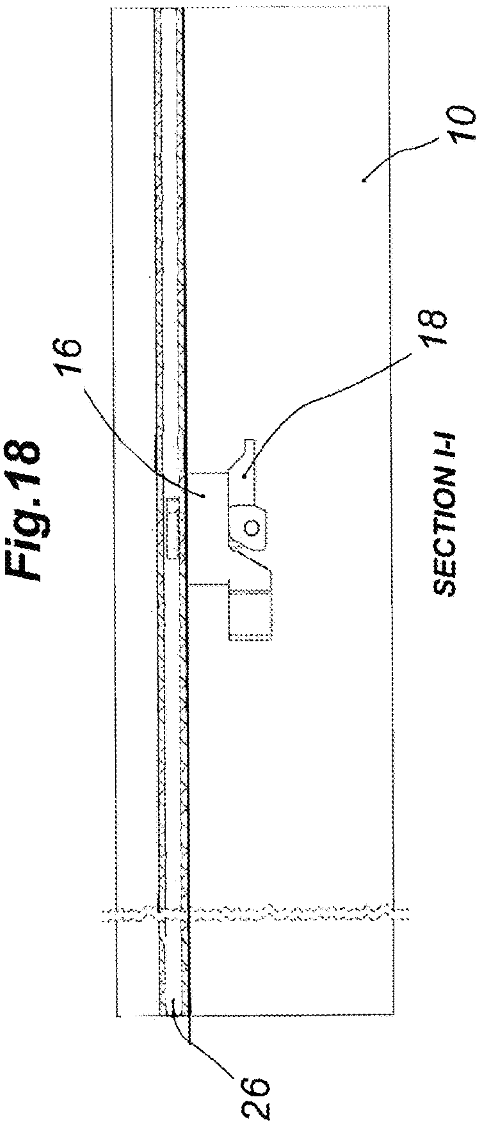
FIG. 18 is a schematic representation of the section along the I-I line of FIG. 17 of the same profile.
Figure 17:
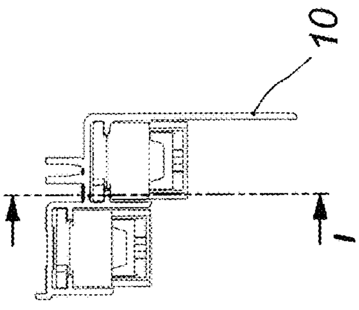
FIG. 17 schematically shows a cross section of a profile in which the device of the invention is, for example, installed in an upside-down position.
Figure 19:
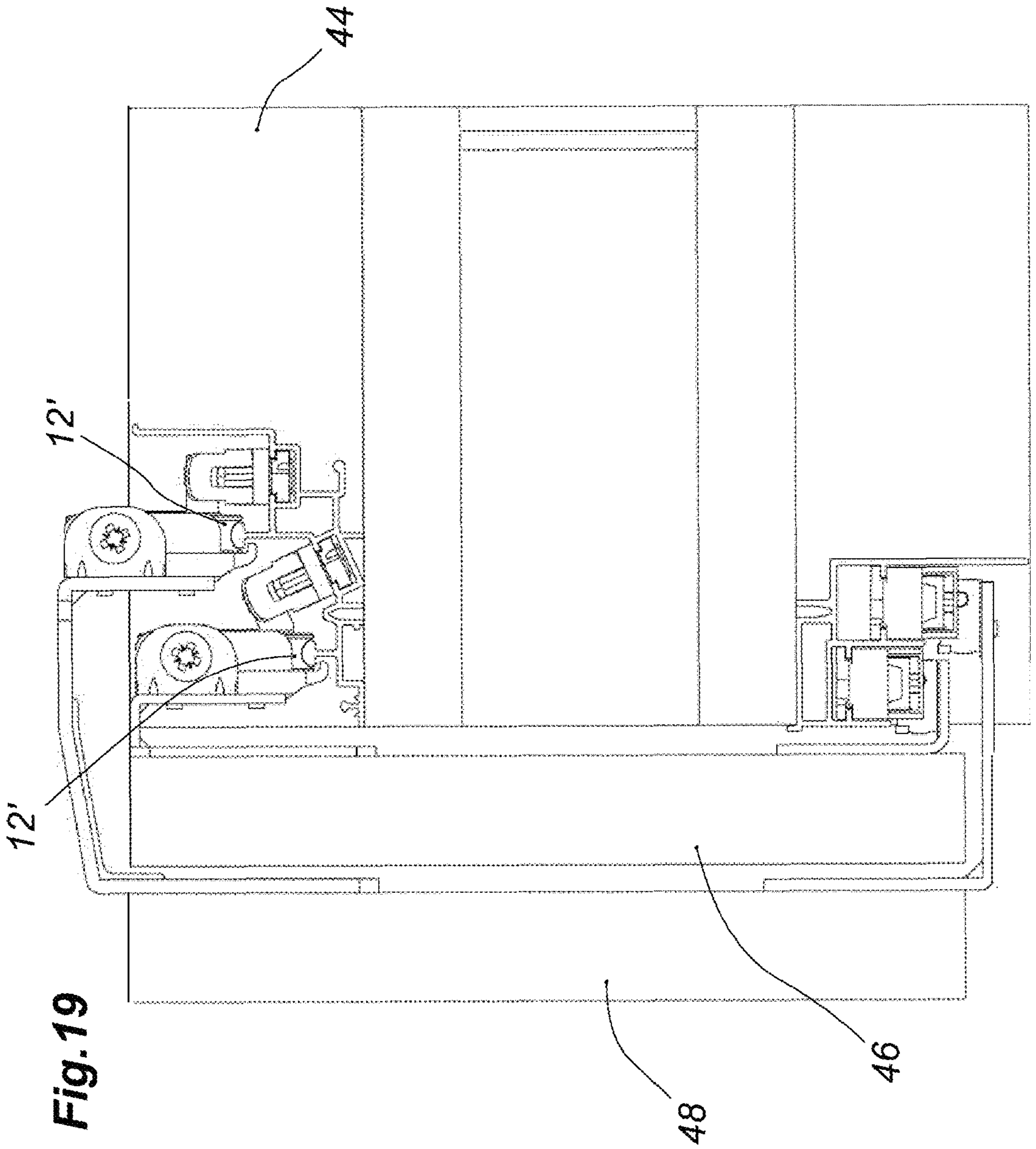
FIG. 19 schematically shows a cabinet provided with profiles for the devices of the invention, placed both above and below.

FIGS. 17 and 18 schematically show the condition in which the device of the invention is installed in an upside-down position, that is, on a profile 10 that is oriented downward instead of upward, for accessories or components arranged in a lower position on a cabinet or the like. FIG. 19 shows precisely, by way of example, the condition in which the device of the invention is arranged both above and below in a cabinet, indicated by 44 and exemplified by having both interior panels 46 and exterior panels 48.

As can be noted from the foregoing, the advantages that the invention achieves are obvious. Thanks to the device of the invention, the hooking, moving and adjusting of accessories along metallic or nonmetallic support profiles is achieved extremely easily and quickly, without the need for tools and thus also within the reach of inexperienced persons. Particularly advantageous is the ability to install any functional device or component from any point on the profile, thus avoiding the need for the traditional and inconvenient insert head-on from one end of the same profile.

Further, any removal of the component from the profile for its replacement or simply for its movement from its original position does not require the complete removal of the profile itself from the furniture and its subsequent repositioning on it, which is extremely useful in the case of unintentional upside-down installation of said component.

Despite the invention having been described above with particular reference to one of its preferred embodiments, made solely by way of a non-limiting example, numerous modifications and variants will appear evident to a person skilled in the art in the light of the above description. The present invention therefore sets out to embrace all the modifications and variants which fall within the scope of the following claims.

The invention claimed is:

1. A device for hooking and adjusting accessories along support profiles, suitable for apparatuses that move cabinet panels or doors along at least one sliding profile; said sliding profile is provided with a longitudinally extended slot delimited by opposite lips, one or more movement elements or carriages connecting said panels or doors with the profile, and one or more stops or shock absorbers with support base to slow down and stop the excursion of the same panels or doors at or near the respective end-strokes along the profile, wherein said device comprises a lower half-part and an upper half-part intended to be connected both to each other in an articulated manner and to the sliding profile along the slot, wherein a rectangular base of the lower half-part defines a plate having an upper surface with a surface finish and a width less than both the width of the slot and the width of a positioning seat accessed from said slot and in which the same base is positioned, and in a central area of the rectangular base of the lower half-part an integral appendage extends vertically therefrom, at the top of said appendage a transverse hole is formed which accommodates a plug to connect said appendage to the upper half-part consisting of a manoeuvring lever, and said upper half-part is provided with a hole for the same plug.

2. The device according to claim 1, wherein the lips delimiting the slot of the profile are provided, on a lower face facing the positioning seat for positioning the base, with protrusions in the form of cantilevered grooves-oriented angularly with respect to the surface finish of the same base arranged in said positioning seat.

3. The device according to claim 2, wherein the upper surface of the base of the lower half-part is provided with a surface finish of a knurling type, and said surface finish is lowered with respect to the rest of the upper surface by an amount substantially equal to the thickness of the lips.

4. The device according to claim 1, wherein the support base of the stop or shock absorber comprises at opposite ends a through opening from which the appendage of the lower half-part protrudes to be connected with said upper half-part through said plug, the base of the lower half-part being housed in the positioning seat of the profile.

5. The device according to claim 4, wherein the base of the lower half-part defines a substantially rectangular plate with two opposite bevelled vertices, and each of the bevelled vertices is provided with said surface finish of a knurling type.

* * * * *